United States Patent
Moeckel

[11] 3,980,461
[45] Sept. 14, 1976

[54] METHOD OF MANUFACTURING A PREFORM FOR USE IN DRAWING GLASS FIBERS

[75] Inventor: Peter Moeckel, Munich, Germany

[73] Assignee: Siemens Aktiengesellschaft, Berlin & Munich, Germany

[22] Filed: Feb. 13, 1975

[21] Appl. No.: 549,655

[30] Foreign Application Priority Data
Feb. 28, 1974 Germany............................ 2409673

[52] U.S. Cl................................. 65/36; 65/3 A; 65/4 A; 65/61; 65/38; 65/54; 350/96 R; 350/96 B
[51] Int. Cl.²..................... C03B 23/20; C03C 19/00
[58] Field of Search.............. 65/36, 37, 38, 39, 61, 65/4 A, 4 B, 4 R, 3 A, 54; 350/96 R, 96 B

[56] References Cited
UNITED STATES PATENTS

| 2,035,827 | 3/1936 | Newel..................................... 65/38 |
| 2,053,551 | 9/1936 | Culver et al............................. 65/38 |
| 2,054,166 | 9/1936 | Reh........................................ 65/38 |
| 3,278,283 | 10/1966 | Bazinet, Jr............................ 65/38 X |
| 3,455,667 | 7/1969 | Snitzer et al......................... 65/38 X |
| 3,455,668 | 7/1969 | Upton..................................... 65/38 |
| 3,542,535 | 11/1970 | Hensler et al....................... 65/39 X |
| 3,647,406 | 3/1972 | Fisher.................................... 65/3 A |
| 3,771,983 | 11/1973 | Straka................................... 65/4 B |
| 3,879,182 | 4/1975 | Strack.................................... 65/39 |
| 3,926,601 | 12/1975 | Hicks, Jr................................ 65/31 |

Primary Examiner—S. Leon Bashore
Assistant Examiner—Frank W. Miga
Attorney, Agent, or Firm—Hill, Gross, Simpson, Van Santen, Steadman, Chiara & Simpson

[57] ABSTRACT

A method of manufacturing a preform from which glass fibers are to be drawn including making a groove in a first cladding glass element, filling the groove with core glass, grinding or otherwise finishing the surface of the cladding element and the core glass to a flat surface and optically contacting a second cladding glass element to the finished surface of said first cladding glass element thereby covering the core glass material.

8 Claims, 10 Drawing Figures

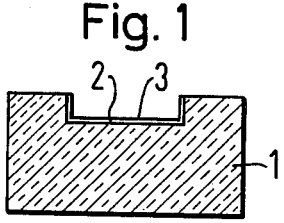
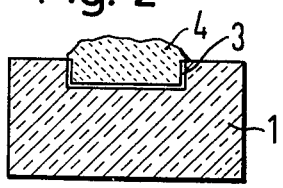
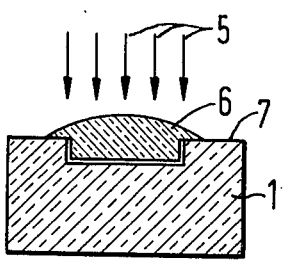
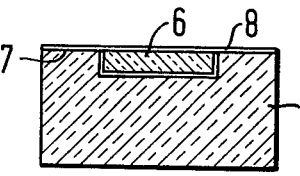
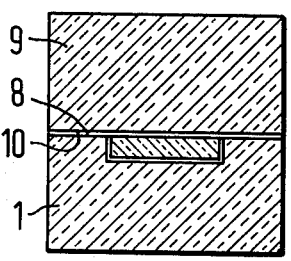
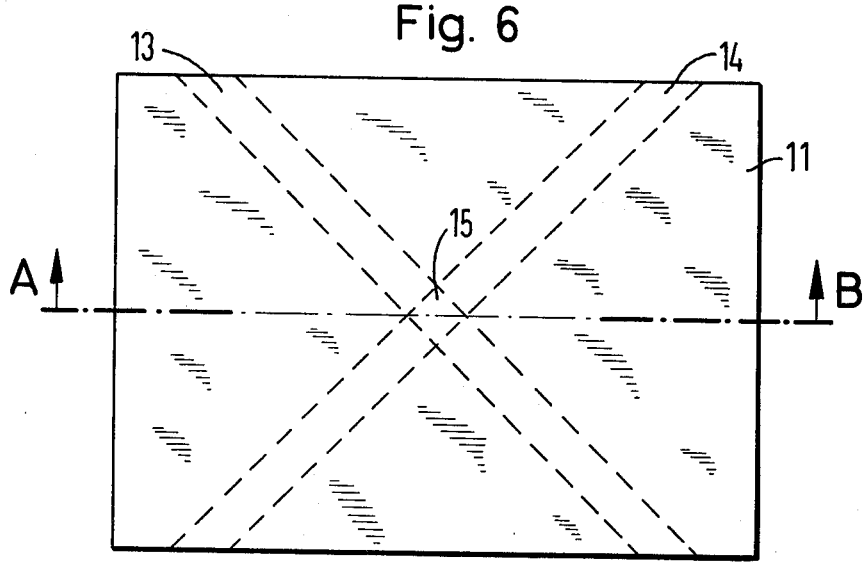
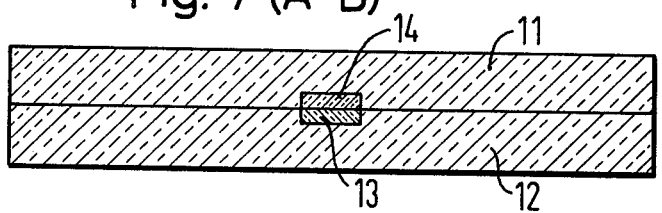

METHOD OF MANUFACTURING A PREFORM FOR USE IN DRAWING GLASS FIBERS

This invention relates to a method of manufacturing a preform from which glass fibers are to be drawn.

It has been proposed that a preform for use in the drawing of glass fibers should be manufactured by producing several cores and cladding portions with flat side faces. To this end, as many identically shaped parts as possible are cut out of the corresponding cladding blocks, the parts as far as possible having exclusively rectangular edges. Subsequently, all the mutually adjacent flat surfaces are polished, and then the cladding blocks are optically contacted to the cores. In this manner, fiber cores having given cross-sectional shapes and cross-sectional sizes can be produced, which, after the drawing of the fibers, are matched to cooperating optical components.

This method of manufacturing a preform, however, has the drawback that a large number of time wasting polishing operations of extremely high precision, are required in order to produce surfaces of adequate quality for optically contacting the individual parts. Also, when optically contacting the individual parts, there is still an air gap left because it is virtually out of the question to polish the core region and the adjoining cladding regions to absolutely identical mating sizes.

Accordingly, it becomes desirable to develop a method of manufacture whereby these difficulties are substantially overcome.

SUMMARY OF THE INVENTION

An object of the present invention is to provide a method of manufacturing a preform from which glass fibers can be drawn which involves fewer time consuming polishing operations.

Another object of the invention is to provide a method of manufacturing a preform which will yield a preform without undesirable air gaps.

Another object of the invention is to achieve a method of manufacturing a preform having glass core and cladding portions for use in drawing glass fibers in which the core may have virtually any desired cross-sectional dimension.

Other objects and advantages of the invention will become more apparent when considering the following description and accompanying drawings.

DESCRIPTION OF THE DRAWINGS

FIGS. 1–5 illustrate progressive steps in making a preform in accordance with the invention;

FIG. 1 is a diagrammatic view in elevation of a cladding glass element in which a groove has been milled to receive core glass;

FIG. 2 is a diagrammatic view of the cladding glass element of FIG. 1 showing core glass powder disposed in the groove;

FIG. 3 is a diagrammatic view of the cladding element of FIG. 1 showing core glass in its hardened form;

FIG. 4 is a diagrammatic view showing the cladding glass element and core element after processing to finished surface;

FIG. 5 is a diagrammatic view showing two cladding glass elements and core element in assembled relation;

FIG. 6 is a plan view showing a preform from which a glass fiber is made having a core portion with a coupling and branching configuration;

FIG. 7 is an elevation view in section taken along line A–B of FIG. 6;

DESCRIPTION OF PREFERRED EMBODIMENTS

Figure 8:
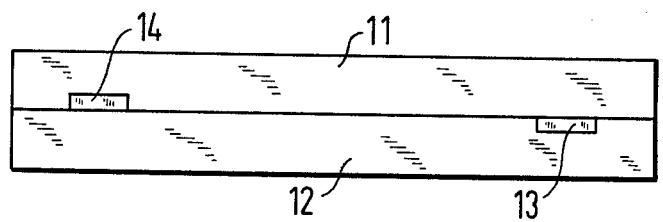
FIG. 8 is a front view in elevation of the preform of FIG. 6.

In accordance with the invention, in at last one partial element of cladding glass, at least one groove is milled and this filled with core glass. Then the surface of the cladding glass partial element together with the core glass located in the groove is processed to a polished flat surface and subsequently a further partial element of cladding glass is optically contacted to the first partial element.

With respect to the core glass, in particular, core glass powder will be used which is poured into the groove and fused using a focused $CO_2$ laser beam so that the molten core glass distributes itself uniformly in the groove and completely fills the latter.

An alternative procedure is to deposit the core glass in the groove by chemical vapor deposition.

In using this method of producing a preform from which glass fibers are to be made only two very high precision polishing operations at the two surfaces which are to be optically contacted are needed. This makes it possible to adapt this manufacturing method to mass production.

A further advantage of the method resides in the fact that it is possible in a simple manner, given the dimensions and shape of the groove cross-section which is to be milled, to manufacture preforms for use in the drawing of fibers, which have fiber cores of virtually any cross-sectional dimension and shape.

Before the glass powder is deposited into the groove, the groove may be coated with a layer of the material of which the core glass powder is made in order to reduce the extent to which the cladding element is itself melted during the melting process, and in order thus to prevent the groove from running. This coating may be applied by a vapor deposition process.

In the case where core and cladding glass materials are of different hardnesses, and an adequately flat surface for optically contacting to the other partial element of cladding glass cannot be obtained when polishing the surface of the cladding element with the filled groove, before optically contacting the other partial element to the first such element, the latter will preferably be provided with a layer of cladding glass material by a vapor deposition procss, and this layer itself then polished flat.

In order to manufacture preforms to be used in making glass fibers with coupling or branching configurations, there may be provided in tow partial elements of cladding glass which are to be optically contacted in each case a groove which is milled obliquely to the subsequent direction of fiber drawing so that the core regions intersect one another after the partial elements have been fitted together.

This procedure enables simple manufacture of preforms for use in the drawing of fibers having multiple cores with the possibility of the individual cores having different dimensions and/or being of different types of glass. To manufacture this kind of preform a correspondingly large number of grooves having given dimensions are milled in a parallel fashion to one another in the cladding element. For example, the preform required for the drawing of a combined monomode-multimode fiber with rectangular cross section of the cores, can be produced very simply in this way.

In order to obtain a preform from which to draw a fiber having cores arranged one beside the other and one above the other, two or more cladding elements, for example, will be manufactured with filled grooves using the method proposed earlier, and optically contacted.

To amplify light signals in the context of communications transmission over long distances, repeater stations must be provided in order to regenerate the signals. This is made possible if, in manufacturing the glass fiber, a laser-active material is chosen as the core glass in the preform.

The invention will now be explained in more detail making reference to the drawings.

FIG. 1 is a cross-sectional view through a partial element of cladding glass 1, in which a groove 2 of the rectangular cross-section has been milled in one surface. Onto the surfaces of this groove, a layer 3 of a core glass material is deposited by a vapor deposition process. On the layer 3, in the manner shown in FIG. 2, a core glass powder 4 is applied and this is melted by means of a $CO_2$ laser beam 5 as shown in FIG. 3. After the core glass 6 has hardened, the surface 7 of the cladding element 1 and that of the core glass 6 are polished flat so that the surface of cladding element and core glass are flush with each other in the manner shown in FIG. 4 and covered with a layer of cladding glass material 8 by a vapor deposition process. After the layer 8 has been polished, an additional partial element of cladding glass 9 likewise with a polished surface 10, is optically contacted to the layer 8 as shown in FIG. 5.

The preform thus produced is then drawn out using conventional techniques, to form a core-cladding fiber of rectangular cross-section.

In FIG. 6 there is a plan view, in FIG. 7 a cross-sectional view and in FIG. 8 a front elevation of a preform from which glass fibers are made which exhibit a coupling and branching configuration. Two partial elements 11 and 12 of a cladding glass each have a groove 13 and 14, which is filled with a core glass. These grooves intersect and contact one another at the central zone 15 of the cladding elements 11 and 12 when the latter have been optically contacted. If this kind of a preform is drawn out to form an optical fiber, then a fiber is produced which has two core portions intersecting one another at a certain point in the fiber.

By parting this preform at the location A–B, a preform is obtained for a glass fiber having a simple branch.

Figure 9:
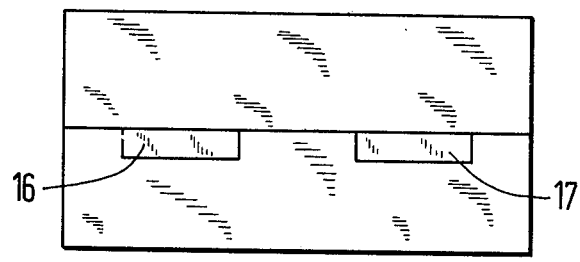
FIG. 9 is a front view in elevation of a preform having parallel core portions.

In FIG. 9 the cross-section of a preform for a glass fiber with two parallel core portions 16 and 17 of rectangular cross-section in each case, has been illustrated. When this preform is drawn, a glass fiber is produced in which two parallel core portions having rectangular cross-sections are obtained.

Figure 10:
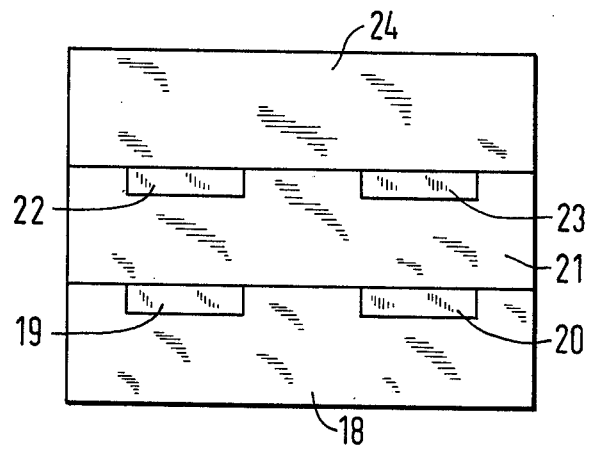
FIG. 10 is a front view in elevation of a preform having multiple parallel core portions disposed alongside each other and one above the other.

FIG. 10 illustrates the cross-section of a preform for use in the drawing of a glass fiber with cores located one beside the other and one above the other. To the cladding element 18 with the filled grooves 19 and 20, a second cladding element 21, likewise containing filled grooves 22 and 23, is optically contacted through the medium of its polished surface. To the polished surface, at the groove side of the cladding element 21 a third cladding element 24 is optically contacted.

In the same manner, multiple cladding elements which contain filled grooves, can be optically contacted.

While preferred embodiments of the invention have been disclosed, it will be appreciated that these have been shown by way of example only, and the invention is not to be limited thereto as other variations will be apparent to those skilled in the art and the invention is to be given its fullest possible interpretation within the terms of the following claims.

I claim:

1. A method of manufacturing a preform having a core portion and a cladding portion for use in drawing glass fibers therefrom comprising:
    a. milling an elongated groove having a rectangular cross section in a flat face of a first cladding glass element;
    b. filling said groove with fused core glass;
    c. polishing flat the laterally adjoining surfaces of said cladding glass element and said core glass; and
    d. optically contacting a flat face of a second cladding glass element to said flat adjoining surface of said first cladding glass element and said core glass.

2. The method of claim 1 wherein said filling is accomplished by the steps of
    depositing core glass in powdered form in said groove,
    fusing said core glass powder in said groove using a focused $CO_2$ laser beam, distributing said molten core glass uniformly in said groove, completely filling said groove with said molten core glass, and cooling said fused core glass.

3. The method of claim 1 wherein said filling is accomplished by vapor depositing said core glass in said groove.

4. The method of claim 2 wherein, before said core glass powder is so deposited in said groove, a layer of core glass is vapor deposited on the surfaces of said groove.

5. The method of claim 1 including applying a vapor deposited layer of cladding glass to said flat adjoining surfaces of said first cladding glass element and said core glass and polishing the resulting said layer flat prior to optically contacting said second cladding glass element thereto.

6. The method of claim 1 wherein said second cladding glass element has a second core glass filled groove in said flat face thereof, said second cladding glass element being prepared by steps through of claim 1.

7. The method of claim 1 wherein said core glass is a laser active material.

8. The method of claim 1 wherein selected portions of a core glass filled groove in said second cladding glass element intersect and contact selected portions of a core glass filled groove in said first cladding glass element.

* * * * *